Patented Jan. 2, 1940

2,185,541

UNITED STATES PATENT OFFICE 2,185,541

DERIVATIVES OF ALPHA HIGHER CARBOXYLIC ACIDS

Frank J. Cahn, Chicago, Ill., assignor to The Emulsol Corporation, Chicago, Ill., a corporation of Illinois No Drawing. Application April 9, 1937, Serial No. 135,957

3 Claims. (Cl. 260—400)

This invention relates to new chemical compounds which have particular utility as interface modifying agents.

In various industries, there is a need for certain classes of chemical substances which possess a modifying action between interfaces such as, for example, oil and water interfaces which are present in emulsions, dispersions and the like. The novel chemical compounds of the present invention possess the property in question and have utility in such fields as the textile and related fields where they function in various ways such as wetting-out agents, softening agents, dyeing assistants, emulsifying and detergent agents; as emulsifying agents in oleaginous-aqueous emulsions generally including the field of edible emulsions; as anti-spattering agents for margarine, the latter being a plastic emulsion of oleaginous and aqueous materials; as penetrating, lathering, and frothing agents in the arts where such functions are desired; as ore flotation agents with and without mineral oil, fatty acids such as oleic acid or other collectors or fatty collectors, and, in general, wherever modification of interfaces is a desideratum.

The novel compounds of the present invention, in general, comprise certain hydrophilic derivatives of higher molecular weight carboxylic acids or derivatives of said acids wherein at least one of the hydrogen atoms attached to the carboxyl group of said higher molecular weight carboxylic acid or derivative is replaced by certain specific classes of hydrophile groups. The hydrophile or hydrophilic or water-solubilizing groups are generally oxygenated sulphur or oxygenated phosphorus groups and include the following as examples thereof; sulphate, sulphonic, phosphate, phosphonic, phosphite, pyrophosphate, orthophosphate, tetraphosphoric acid, sulpho-carboxylic acid such as sulpho-acetate, sulpho-propionate, sulpho-butyrate. In certain cases, the hydrophilic group may comprise polyhydroxycarboxylic acid radicals suitably linked to the carbon in the alpha position to the carboxylic group of the higher carboxylic acid as illustrated in Examples 6 and 7 listed hereinbelow, or the hydrophilic group may comprise a sulfonium group as indicated in Example 14 below. It has been found, peculiarly enough, that the aforementioned hydrophilic groups must be present in the alpha position to the carboxyl group of the higher molecular weight carboxylic acid or derivative of the latter in order to function properly for the purposes indicated above.

It is accordingly an object of this invention to prepare new chemical compounds.

Another object of the present invention is the preparation of new chemical compounds having particular utility as interface modifying agents.

Still another object of the invention is the preparation of new and useful chemical compounds in the form of certain derivatives of higher molecular weight carboxylic acids.

These and other objects of the invention will become still further apparent in the light of the following more detailed description of the invention.

As has been indicated above, certain hydrophilic groups or classes of groups, previously described, are introduced into the alpha position of the higher molecular weight carboxylic acid. It will be understood that the hydrophile groups or hydrophilic groups possess an affinity for water or aqueous media. These groups impart to the molecule, of which they form a part, a tendency to become soluble in water or aqueous media. The degree or extent of the hydrophilic properties is dependent upon the number and character of the hydrophile groups and the character of the other group or groups with which it is associated in the molecule. It is likewise apparent that the various hydrophile groups will vary in hydrophilic potency.

Among the higher molecular weight carboxylic acids which may be employed to produce compounds suitable for the purposes of this invention are the following: higher fatty acids, saturated and unsaturated, such as caproic, capric, caprylic, lauric, myristic, palmitic, oleic, stearic, linoleic, ricinoleic, melissic, 1-hydroxystearic; mixed higher fatty acids, saturated and unsaturated, derived from animal or vegetable sources, for example, lard, coconut oil, corn oil, cottonseed oil, sardine oil, partially or completely hydrogenated animal and vegetable oils such as cottonseed oil, corn oil, sesame oil, lard and soya bean oil; higher carboxylic acids derived from various waxes such as beeswax, spermaceti, and carnauba wax; higher molecular weight straight chain and branched chain carboxylic acids derived by oxidation and other methods from petroleum; hydroaromatic carboxylic acids such as dihydro methylcyclo-hexylidene acetic acid, and cycloaliphatic acids such as various naphthenic acids.

In order that those skilled in the art may have a full picture of the nature and scope of the present invention, there are listed hereinbelow various compounds which may be employed successfully, in accordance with the invention, for the purposes indicated hereinabove.

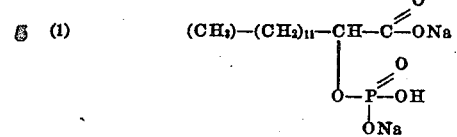
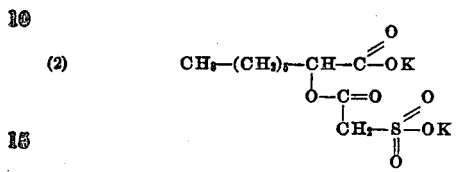
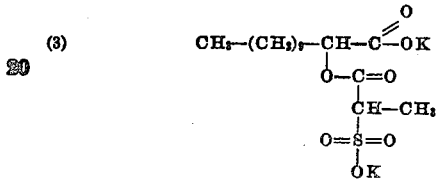
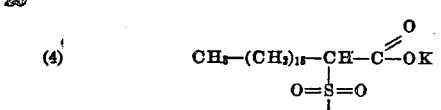
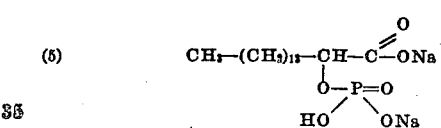
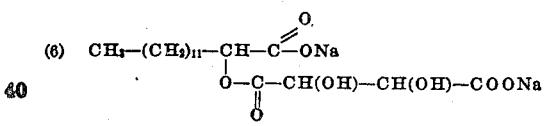
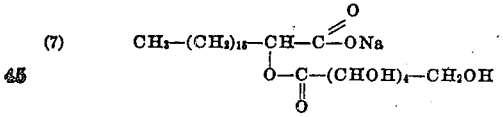
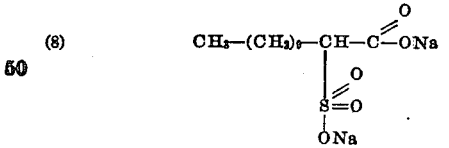
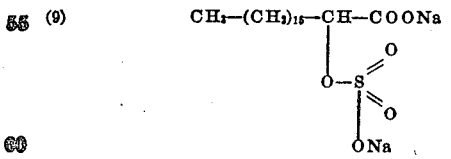
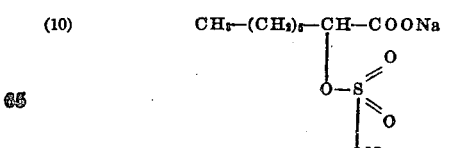
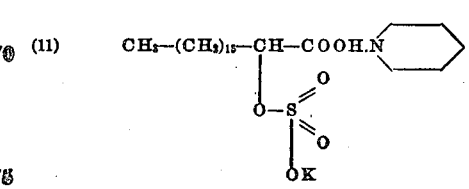
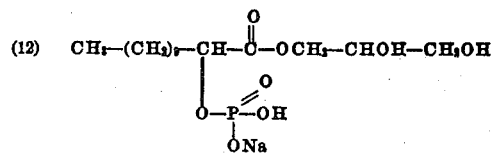
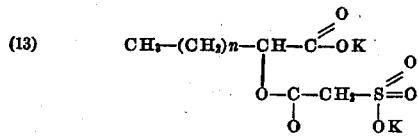

($n$ is primarily 9 and 11—derived from coconut oil fatty acids.)

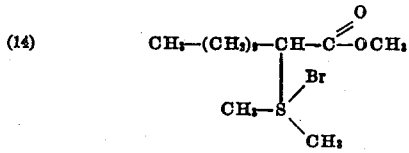

While the above compounds represent single substances, in practice it is generally more convenient to make and use compositions of which said compounds form only a part as, for example, reaction mixtures containing said compounds. In addition, mixtures of any two or more of said compounds may be employed with excellent results if desired.

As is apparent from the various examples of the novel compounds listed above, most of said compounds are higher molecular weight carboxylic acids, particularly higher fatty acids, and derivatives thereof wherein at least one hydrogen attached to the carbon adjacent to the carboxyl group is replaced by a radical containing oxygenated sulphur or oxygenated phosphorus. The compounds in said list numbered (1) to (5), inclusive, and (8) to (13), inclusive, fall into this category. The other compounds in said list, namely, those numbered (6), (7), and (14), while not falling into the above category, nevertheless are characterized by the presence, in the alpha position to the carboxyl group of the higher molecular weight carboxylic acid or derivative thereof, of particular types of hydrophile groups in place of hydrogen.

In general, and as is evident by a consideration of the examples listed above, the carboxyl group of the fatty acid, modified by substituting particular hydrophile groups in the alpha position as described, may be neutralized with organic or inorganic substances, may be esterified or converted to an amide, or may be simply allowed to remain as such.

The following examples are illustrative of methods of producing various of the novel compounds of the present invention:

*Example A*

100 grams of alpha hydroxystearic acid were dissolved in 200 cc. of ethylene dichloride and chilled to —20 degrees C. 40 grams of chlor-sulphonic acid were added to the solution, while stirring, whereby the temperature was allowed to rise gradually to 10 degrees C. In the presence of ice, a chilled 10% sodium hydroxide solution was added until a neutralized reaction was obtained, the temperature being kept below 5 degrees C. The solution thus obtained was evaporated on the water bath and the residue extracted with hot isopropyl alcohol containing 10% of water. The isopropyl alcohol extract on evaporation yielded the alpha sulphate ester sodium salt of sodium stearate, a white powder, freely soluble in water.

Example B 9.7 grams of anhydrous glycerol were heated with 36.1 grams of alpha bromstearic acid for 3 hours at 130 degrees C. and then for 6 hours at 160 degrees C. 11.4 grams of the reaction mixture were dissolved in 10 grams of pyridine and the solution allowed to stand for one week at room temperature. The excess pyridine and glycerol were dissolved out with petroleum ether. The substance obtained, the glycerol ester of alpha brom pyridinium stearic acid, is a brown paste, soluble in water.

Example C 100 grams of alpha hydroxy coconut oil fatty acids were heated with 100 grams of mono chloracetic acid at 160 degrees C. for 4 hours while passing a slow stream of carbon dioxide through the mixture. After the reaction was over, the product was washed repeatedly with hot water to free it from excess chloracetic acid. 44 grams of the resulting chloracetate, containing 68.5% of the theoretical chlorine content, were stirred with a saturated aqueous solution containing 72 grams of potassium sulphite for 8 hours, the temperature being gradually raised from 50 degrees C. to 70 degrees C. and the evaporated water being gradually replenished. All of the chlorine present thereby transformed into the ionized form. 8 volumes of hot isopropyl alcohol were then poured over said product. The hot isopropyl alcohol was then decanted and the remainder filtered from the inorganic salts. Upon evaporation of the isopropyl alcohol, the product obtained contained 71% of the theoretical sulphur content. The substance, sulphoacetic acid esters of alpha hydroxy coconut oil fatty acids, potassium salt, is a yellow wax-like material, freely soluble in hot water.

In those cases where the hydrophilic group, in the alpha position to the carboxyl group of the higher molecular weight carboxylic acid or derivative thereof, contains an acidic or replaceable hydrogen, the latter may be replaced by any suitable cation of organic or inorganic character. These include the alkali metals, ammonium, calcium, magnesium, aluminum, zinc, and the like. Furthermore, aliphatic and aromatic amines including alkylolamines such as monoethanolamine, diethanolamine, triethanolamine and mixtures thereof, pyridine, quaternary ammonium bases such as tetra-methyl ammonium hydroxide, tetra-ethyl ammonium hydroxide, and other anti-acid materials may be used to neutralize acid groups such as carboxyl, sulphuric and phosphoric groups.

Wherever the term "higher" is used in the specification and claims to refer to the chemical compounds of this invention as, for example, higher fatty acids, the term "higher" will be understood to cover at least six carbon atoms.

What I claim as new and desire to protect by Letters Patent of the United States is:

1. The class consisting of carboxylic acids having at least six carbon atoms, their salts, esters and amides, wherein at least one hydrogen attached to the carbon atom adjacent to the carboxyl group is replaced by the radical

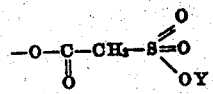

wherein Y is a cation.

2. The class consisting of fatty acids having at least six carbon atoms, their salts, esters and amides, wherein at least one hydrogen attached to the carbon atom adjacent to the carboxyl group is replaced by the radical

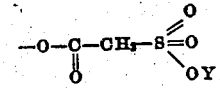

wherein Y is a cation.

3. Chemical compounds in accordance with claim 2, wherein the fatty acids are derived from the class consisting of oils, fats and waxes and contain predominantly between ten and eighteen carbon atoms.

FRANK J. CAHN.